(12) United States Patent
Lee et al.

(10) Patent No.: US 12,728,741 B2
(45) Date of Patent: Sep. 8, 2026

(54) CHARGING CABLE FOR AN ELECTRIC VEHICLE CHARGER

(71) Applicants: HYUNDAI MOTOR COMPANY, Seoul (KR); KIA CORPORATION, Seoul (KR)

(72) Inventors: Woo Hyung Lee, Uijeongbu-si (KR); Sang Jin Lee, Suwon-si (KR); Young Tae Choi, Gwacheon-si (KR); Kwang Min Oh, Hwaseong-si (KR); Ho Choi, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 788 days.

(21) Appl. No.: 18/117,097

(22) Filed: Mar. 3, 2023

(65) Prior Publication Data

US 2024/0140224 A1 May 2, 2024

(30) Foreign Application Priority Data

Oct. 26, 2022 (KR) ........................ 10-2022-0138826

(51) Int. Cl.
*B60L 53/18* (2019.01)
*B60L 53/302* (2019.01)
*H01B 7/42* (2006.01)

(52) U.S. Cl.
CPC .............. *B60L 53/18* (2019.02); *H01B 7/423* (2013.01); *B60L 53/302* (2019.02)

(58) Field of Classification Search
CPC ........ B60L 53/18; B60L 53/302; B60L 53/31; B60L 2240/36; H01B 7/425; H01B 9/02; H01B 7/0823; H01B 7/423; H01R 13/56; H01R 13/52; H01R 13/562; H01R 13/629; H01R 13/639; H01R 13/6683; H01R 2201/26; G01K 1/02; H05K 7/20272; Y02T 10/70; Y02T 10/7072; Y02T 90/14
USPC ......................................................... 174/68.1
See application file for complete search history.

(56) References Cited

U.S. PATENT DOCUMENTS

2016/0121747 A1* 5/2016 Jefferies .................. B60L 53/16 320/109
2018/0190410 A1* 7/2018 Cao ........................ H01B 9/006

* cited by examiner

*Primary Examiner* — Timothy J Thompson
*Assistant Examiner* — Michael F McAllister
(74) *Attorney, Agent, or Firm* — Lempia Summerfield Katz LLC

(57) ABSTRACT

A charging cable for an electric vehicle includes a cable main body having a flat cross-section in a width direction thereof and partitioned into a plurality of internal regions. The charging cable includes terminal portions through which positive and negative power cables, a communication/sensor cable, a coolant flow channel, and a ground pass into the plurality of internal regions, respectively. The terminal portions are arranged in a row in the width direction of the cable main body.

9 Claims, 7 Drawing Sheets

[ CHARGING IS IN PROGRESS ]

[ IN STANDBY STATE FOR CHARGING ]

CHARGING CABLE FOR AN ELECTRIC VEHICLE CHARGER

CROSS-REFERENCE TO RELATED APPLICATION

This application claims under 35 U.S.C. § 119(a) the benefit of priority to Korean Patent Application No. 10-2022-0138826 filed on Oct. 26, 2022, the entire contents of which are incorporated herein by reference.

BACKGROUND

(a) Technical Field

The present disclosure relates to a charging cable for an electric vehicle charger. More particularly, the present disclosure relates to a charging cable for an electric vehicle charger that is capable of decreasing a curvature radius by employing a structure in which the charging cable has a flat cross-section.

(b) Background Art

Usually, a charging cable for an electric vehicle charging apparatus has a predetermined thickness and has a multiplicity of wires built into the charging cable. For this reason, the charging cable has less flexibility and a heavyweight. Thus, there is a disadvantage in that the charging cable is not easy to handle or store.

Therefore, in a case where the electric vehicle charging apparatus performs charging, it is inconvenient to move a charging gun or a charging cable according to a location where an electric vehicle stops. Moreover, there is a concern that the charging cable may be damaged when excessive force is applied thereto.

A high-voltage electric current typically flows through the charging cable. For this reason, a risk of electric shock may occur when damage to the charging cable is caused by entanglement or the like of the charging cable.

In addition, the charging cable has a circular cross-section and thus has a relatively high, i.e., limited or maximum radius of approximately 300 mm to 310 mm when bent. Accordingly, the charging cable has less flexibility and usability due to its high curvature or bending radius.

In recent years, the need for and the importance of electric vehicle charging apparatuses have increased with the wide availability and use of electric vehicles. Moreover, there has been a growing trend toward miniaturization of the electric vehicle charging apparatus and high-performance functions thereof in terms of design. However, due to the limited curvature radius of the charging cable as described above, the charging cable provided on all electric vehicle charging apparatuses is fully exposed to the environment.

Accordingly, external environmental elements make the charging cable susceptible to degradation and contamination. Thus, problems occur in that a charging coupler may be damaged, spoiling an image of a charging station.

SUMMARY

Accordingly, it is important to improve usability of the charging cable by decreasing the curvature radius of the charging cable and thus developing various designs of electric vehicle charging apparatus and employing a structure in which the charging cable is entirely hidden.

An object of the present disclosure is to provide a charging cable for an electric vehicle charger. The charging cable is capable of being bent to a decreased curvature or bending radius by employing a flat structure in which inner electric wires are arranged in a row. Thus, the charging cable is capable of being accommodated inside the electric vehicle charger. With this configuration, the charging cable is capable of being minimally exposed to the outside environment when in a standby state for charging. Thus, the configuration not only improves an image of an electric vehicle charging station, but also protects the charging cable from degradation and contamination due to external environmental elements. Moreover, the charging cable makes it possible to design a compact electric vehicle charger, thus providing ease of installation thereof in a downtown area or the like.

According to an aspect of the present disclosure, a charging cable for an electric vehicle charger is provided. The charging cable includes a cable main body having a flat cross-section extending in a width direction thereof and partitioned into a plurality of internal regions. The charging cable further includes terminal portions through which positive and negative power cables, a communication/sensor cable, a coolant flow channel, and a ground pass into the plurality of internal regions, respectively. The terminal portions are arranged in a row across the width direction of the cable main body.

In the charging cable, the positive and negative power cables may be arranged in such a manner as to pass through end internal regions, respectively, in each widthwise end portion of the cable main body. Both end portions result from partitioning the cable main body.

In the charging cable, the coolant flow channel may be arranged in such a manner as to pass through a central internal region, in a center portion of the cable main body. The center portion results from partitioning the cable main body. The communication/sensor cable and the ground may be arranged in such a manner as to pass through intermediate internal regions, respectively, one on each side of the coolant flow channel.

In the charging cable, outlet flow channels of the coolant flow channel may extend to the internal regions at each end portion of the cable main body, through which the positive and negative power cables, respectively, pass. The outlet flow channels of the coolant flow channel may pass through the internal regions, respectively, in such a manner as to face the positive and negative power cables, respectively.

In the charging cable, the communication/sensor cable in one of the intermediate internal regions may include a plurality of signal cables that are packaged into modules, respectively, and may include a shield layer with which the plurality of signal cables that are packaged into modules, respectively, are wrapped. The plurality of signal cables may include temperature sensor cables.

According to another aspect of the present disclosure, an electric vehicle charger for an electric vehicle is provided. The electric vehicle charger includes a charger main body, a releasing guide mounted inside the charger main body, and a cable main body connected to the releasing guide. The cable main body has a flat cross-section in a width direction thereof and is partitioned into a plurality of internal regions. The electric vehicle charger further includes terminal portions through which positive and negative power cables, a communication/sensor cable, a coolant flow channel, and a ground pass into the plurality of internal regions, respectively. The terminal portions are arranged in a row across the width direction of the cable main body.

In the electric vehicle charger, the releasing guide may be formed to have a structure whereby, in a state where the cable main body is repeatedly wound around the releasing guide, the cable main body is selectively released out of the charger main body by the releasing guide being rotated.

In the electric vehicle charger, the releasing guide may include a rotary disc on which the cable main body rests and may be formed to have a structure whereby the rotary disc is selectively rotated clockwise or counterclockwise according to a standby state for charging or a charging state. Thus, the cable main body is released out of the charger main body in the charging state.

In the electric vehicle charger, the terminal portions may be formed by arranging the positive and negative power cables in end internal regions, respectively, in each end portion of the cable main body in such a manner as to pass therethrough, respectively. The terminal portions may also be formed by arranging the coolant flow channel in a central internal region in a center portion of the cable main body in such a manner as to pass therethrough. Furthermore, the terminal portions may be formed by arranging the communication/sensor cable and the ground in an intermediate internal region between the coolant flow channel and the positive power cable and in an intermediate internal region between the coolant flow channel and the negative power cable, respectively.

According to the present disclosure, a flat-shape structure of the cable main body in which inner electric wires are arranged in a row is employed. Thus, the charging cable can be bent to a decreased or smaller curvature radius, thereby enabling the charging cable to be accommodated inside the electric vehicle charger. Accordingly, the charging cable is minimally exposed to the outside in the standby state for charging. Thus, the effect of possibly improving the image of the electric vehicle charging station can be achieved.

According to the present disclosure, degradation and contamination of the charging cable due to exposure to external environmental elements can be prevented, and a compact electric vehicle charger can be designed. Thus, the effect of possibly providing ease of installation of the compact electric vehicle charger in a downtown area or the like can be achieved.

In addition, according to the present disclosure, the charging cable is selectively released by a user during charging in a state of being accommodated inside the electric vehicle charger. With this structure, the effect of possibly preventing the charging cable from being damaged due to falling out of a charging coupler and possibly improving the usability of the charging cable can be achieved.

BRIEF DESCRIPTION OF THE DRAWINGS

The above and other features of the present disclosure are described in detail with reference to certain examples thereof illustrated in the accompanying drawings, which are given herein below by way of illustration only, and thus are not limitative of the present disclosure, and wherein.

DETAILED DESCRIPTION

Embodiments of the present disclosure are described in detail below with reference to the accompanying drawing.

Advantages and features of the present disclosure and a method of achieving the advantages and the features should be apparent from the embodiments that are described below in detail with reference to the accompanying drawings.

However, the present disclosure is not limited to the embodiments that are disclosed below and may be practiced in various different forms. The embodiments are only provided to make a complete disclosure of the present inventive concept and to provide a person of ordinary skill in the art to which the present disclosure pertains with definite notice as to the scope of the present disclosure. The scope of the present disclosure should be only defined as in the claims.

In addition, a detailed description of well-known technology or the like related to the present disclosure, when determined as making the gist and nature of the present disclosure obfuscated, has been omitted.

Figure 1:
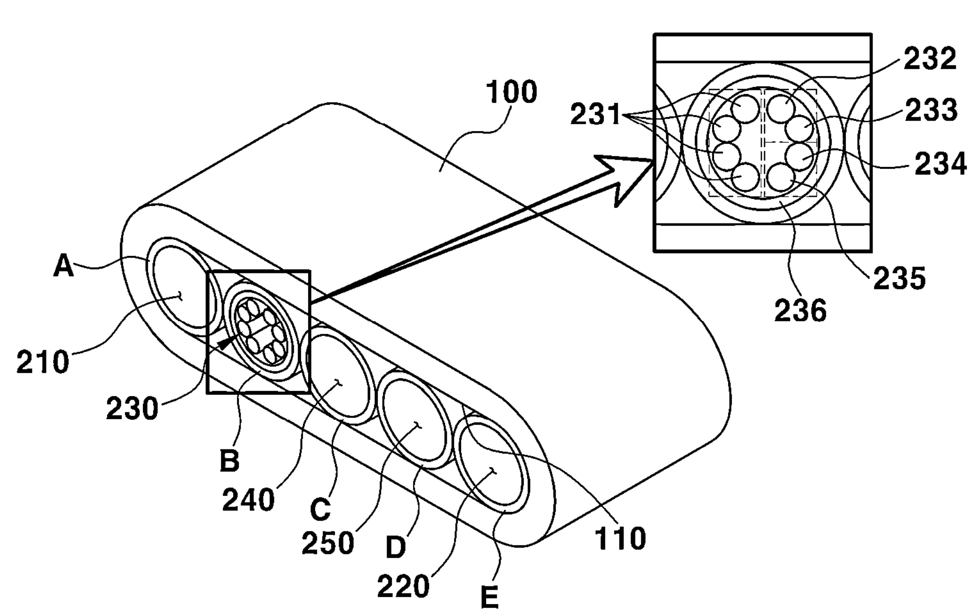
FIGS. 1 and 2 are views, each schematically illustrating a structure of a charging cable for an electric vehicle charger according to an embodiment of the present disclosure.
Figure 2:
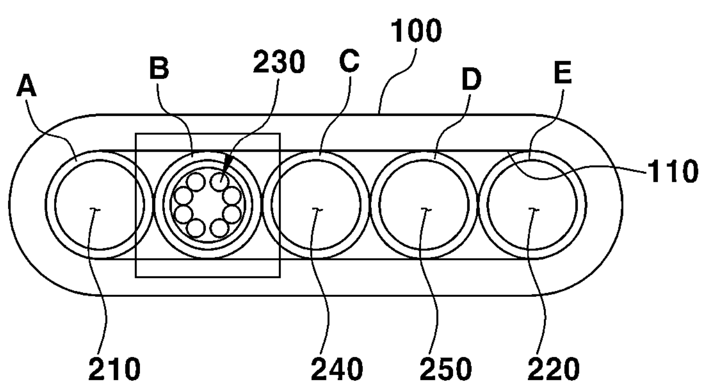
Figure 3:
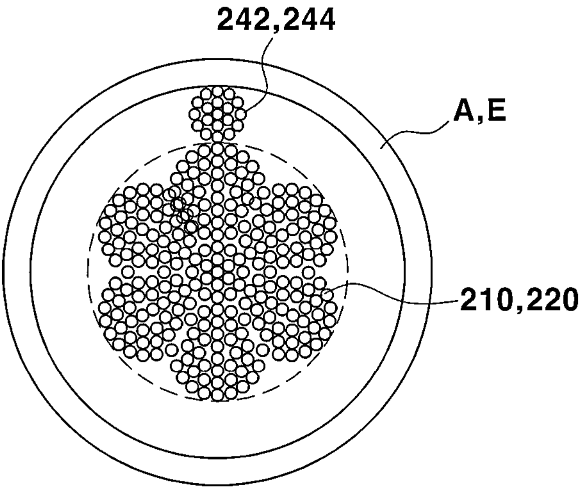
FIG. 3 is a view illustrating an internal region of a charging cable for an electric vehicle charger according to an embodiment of the present disclosure, where positive and negative power cables, respectively pass through the end internal regions.

FIGS. 1 and 2 are views, each schematically illustrating a structure of a charging cable for an electric vehicle charger according to an embodiment of the present disclosure. FIG. 3 is a view illustrating an internal region of the charging cable for an electric vehicle charger according to an embodiment of the present disclosure. The internal region is representative of the region through which either one of the positive power cable or the negative power cable respectively, passes.

Figure 4:
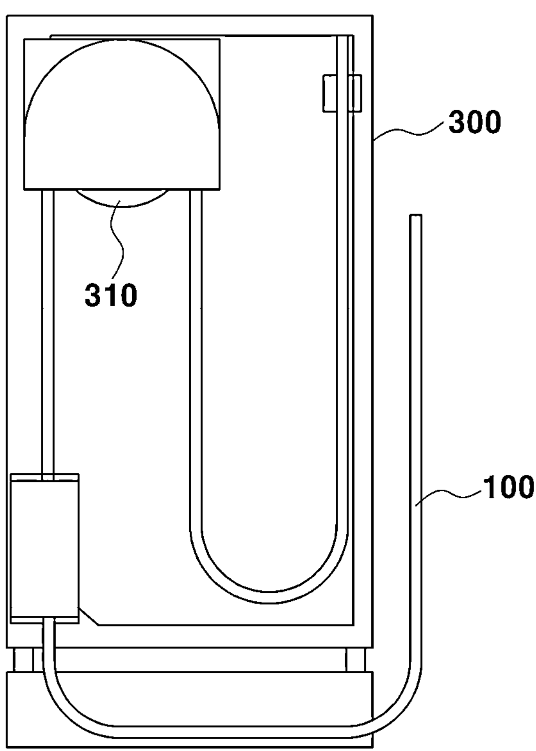
FIG. 4 is a view illustrating a practical example of a charger main body for the charging cable for an electric vehicle charger according to an embodiment of the present disclosure.
Figure 5:
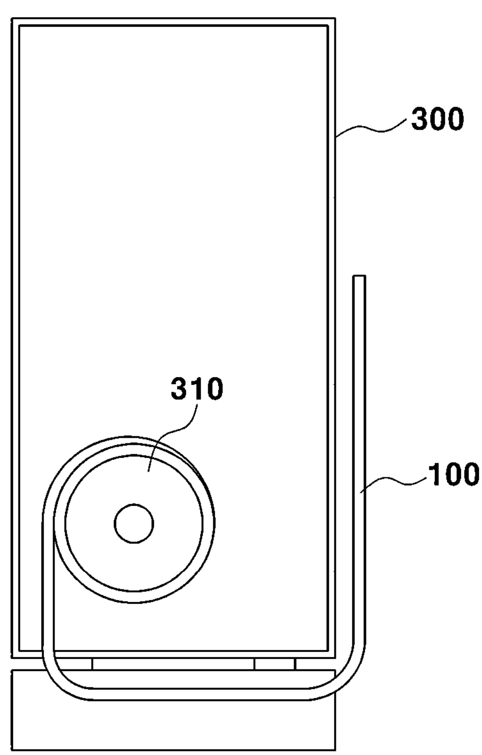
FIG. 5 is a view illustrating another practical example of the charger main body for the charging cable for an electric vehicle charger according to an embodiment of the present disclosure.
Figure 6A:
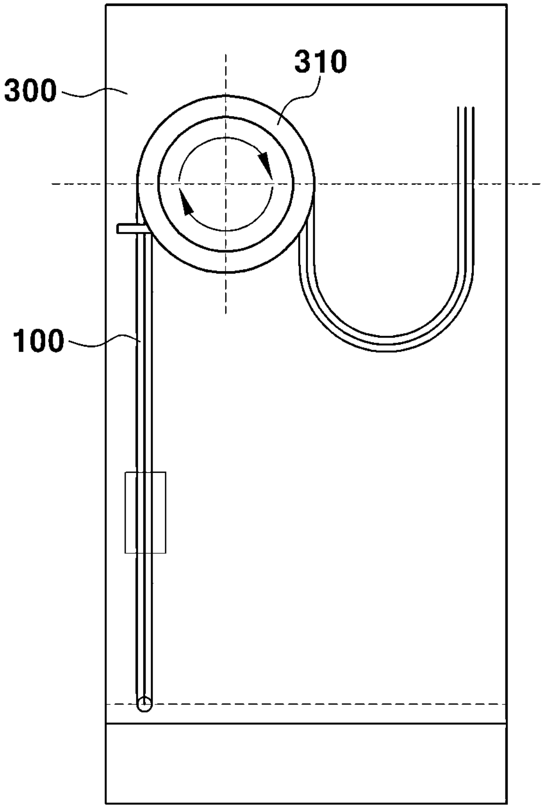
FIGS. 6A and 6B are views, each illustrating that the charging cable for an electric vehicle charger is released out of the electric vehicle charger according to an embodiment of the present disclosure.
Figure 6B:
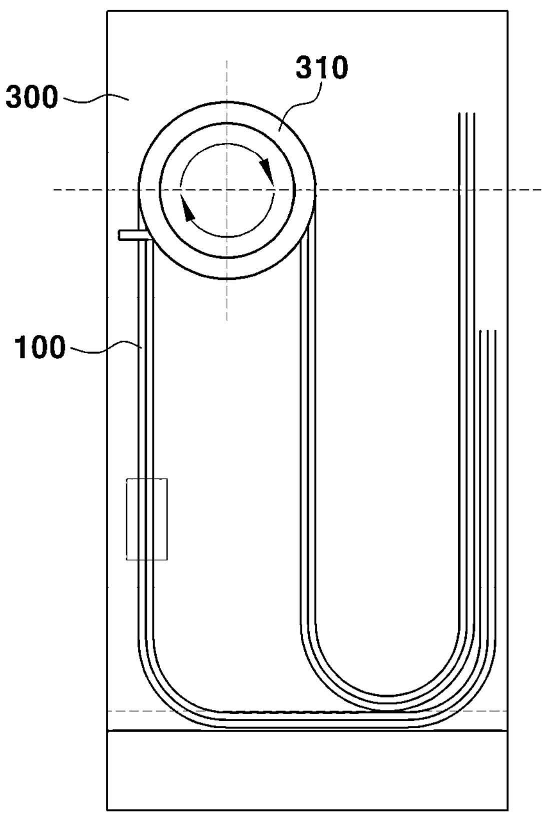

FIG. 4 is a view illustrating a practical example of a charger main body for the charging cable for an electric vehicle charger according to an embodiment of the present disclosure. FIG. 5 is a view illustrating another practical example of a charger main body for the charging cable for an electric vehicle charger according to an embodiment of the present disclosure. FIGS. 6A and 6B are views, each illustrating that the charging cable for an electric vehicle charger is released out of the charger main body according to an embodiment of the present disclosure.

A charging cable in the related art has a circular structure in cross-section. In the related art, positive and negative power cables, a plurality of temperature sensors, a proximity pilot (PP)/control pilot (CP), a plurality of signal cables, a coolant flow channel, a ground, and the like are wrapped with a cable outer sheath having a circular cross-section.

This charging cable has a structure in which a plurality of inner electric wires, as described above, is wrapped with the circular cable outer sheath and is formed to extend to a predetermined length. The circular cable outer sheath has a circular cross-section, and a bent portion of the charging cable is capable of achieving a curvature radius of approximately only 300 mm to 310 mm. In other words, the bent portion of the charging cable is limited to being bent to a curvature radius of approximately 300 mm to 310 mm. For this reason, a volume of the charging cable when wound or rolled up when stored is relatively large, which makes the charging cable difficult to accommodate inside an electric vehicle charger when stored or not being used.

In other words, the charging cable has a circular cross-section that has a relatively small cross-sectional area. Thus, the curvature radius of the bent portion is relatively increased, thereby decreasing the pliability (e.g., flexibility) of the charging cable. Accordingly, it is difficult to accommodate the charging cable inside the size-limited electric vehicle charger in a manner that is releasable for later use.

Therefore, the electric vehicle charger in the related art is provided together with a charging coupler, with the charging cable being exposed to the outside. Accordingly, a problem occurs in that the electric vehicle charger in the related art is susceptible to degradation or contamination or the like due to external environmental elements. Moreover, the charging cable is fully exposed from an exterior appearance of the electric vehicle charger. Accordingly, another problem occurs, such as spoiling the image, i.e., the aesthetic appearance, of an electric vehicle charging station.

As illustrated in FIGS. 1 and 2, in order to solve these problems, the charging cable for an electric vehicle charger, according to the present disclosure, includes a cable main body 100 and terminal portions 110.

The cable main body 100 has a predetermined length and is connected to an electric vehicle charger. The cable main body 100 has a flat cross-section extending across or in a width direction thereof and is partitioned into a plurality of internal regions A-E.

The cable main body 100 may be partitioned into five internal regions A-E across the width direction thereof. However, the cable main body 100 may be partitioned into any number of internal regions, depending on the number of cables extending therethrough, and is not limited to the five internal regions as described herein. With this structure, the cable main body 100 may be capable of a more decreased or reduced, i.e., less limited, curvature radius than in the related art.

More specifically, the cable main body 100 is formed in the width direction thereof in such a manner as to have a flat cross-section. Thus, the cable main body 100 is capable of a curvature radius that is decreased relatively more than in the case of a circular cross-section of a cable main body in the related art. For this reason, with the decreased curvature radius, the cable main body 100 extending to a predetermined length inside the electric vehicle charger may be repeatedly bent in the shape of the letter "U," and thus may be more easily accommodated inside an electric vehicle charger (refer to FIG. 4).

In this embodiment, positive and negative power cables 210 and 220, a communication/sensor cable 230, a coolant flow channel 240, and a ground 250 pass through the terminal portions 110 into or along the plurality of different internal regions A to E, respectively, in the main cable body 100. The terminal portions 110 are provided and are arranged in a row in the widthwise direction of the cable main body 100 having a flat cross-section.

The positive and negative power cables 210 and 220 are arranged in such a manner as to pass through the internal regions A and E, respectively. In this embodiment, the internal regions A and E may be referred to as the outermost or opposite end portions or lateral side portions, in the widthwise direction, in both widthwise end portions of the cable main body 100 that result from partitioning the cable main body 100.

In other words, the positive and negative power cables 210 and 220 each have a relatively heavier weight than the communication/sensor cable 230, the coolant flow channel 240, and the ground 250. For this reason, the positive and negative power cables 210 and 220 are arranged in such a manner as to pass through the internal regions A and E, respectively. Thus, resulting from the partitioning of the cable main body 100, the positive and negative power cables 210 and 220 are positioned in both end portions, i.e., the opposite lateral side or end portions thereof in the width direction. The arrangement is to distribute the weight of the cable main body 100 efficiently and provide curvature rigidity.

The communication/sensor cable 230 is mounted installed in an intermediate internal region B, as illustrated in an enlarged cut-away view in FIG. 1. The ground cable 250 is mounted or is installed in an intermediate internal region D, also as illustrated in FIG. 1. The communication/sensor cable 230 may include a plurality of signal cables that are packaged into modules, respectively. The communication/sensor cable 230 also includes a shield layer 236 with which the plurality of signal cables that are packaged into modules, respectively, are wrapped. As an example, the plurality of signal cables may include four temperature sensor cables 231, and a proximity pilot (PP) 232 that controls a signal for a condition for fastening the charging coupler and a vehicle charging inlet port to each other. In addition, the plurality of signal cables may include a control pilot (CP) 233 that performs communication control and positive and negative measurement signal lines 234 and 235.

In one embodiment, the shield layer 236 may have a braided-wire structure.

In other words, in the case of a normal electric vehicle charging power source, a large amount of switching noise occurs when performing power conversion and control. This because the electric vehicle charging power source affects a communication signal with an electric vehicle and a measurement and control signal for temperature or the like. In order to prevent this phenomenon, according to the present embodiment, the temperature sensor cable 231, the proximity pilot (PP) 232, the control pilot (CP) 233, and the positive and negative measurement signal lines 234 and 235 are each formed in such a manner as to have a twist pair wire structure and are all wrapped with one braided-wire shield layer 236. In this manner, the noise effect due to electromagnetic interference can be reduced.

The coolant flow channel 240 is arranged in such a manner as to pass through a central internal region C in a center portion of the cable main body 100, which also results from partitioning the cable main body 100. Moreover, the communication/sensor cable 230 and the ground 250 are arranged in such a manner as to pass through the intermediate internal regions B and D, respectively, on opposite sides of the coolant flow channel 240 and the central internal portion C.

An inlet flow channel of the coolant flow channel 240 is arranged in the center portion of the cable main body 100 having the flat cross-section. For this reason, the amount of heat generated in the entire cable main body 100 can be reduced. Accordingly, the efficiency of cooling the cable main body 100 can be increased.

Usually, in a configuration of terminal portions 110 comprising a plurality of cables, the positive and negative power cables 210 and 220 enclosed therein are where a relatively large amount of heat is generated. Thus, if the coolant flow channel 240 is arranged adjacent to either of the positive and negative power cables 210 and 220, that will cause a poor weight distribution of the cable main body 100 as well as poor efficiency of cooling by the coolant flow path 230.

Accordingly, as illustrated in FIG. 3, outlet flow channels 242 and 244 of the coolant flow channel 240 extend to the internal regions A and E, respectively, through which the positive and negative power cables 210 and 220, respectively, pass. Furthermore, the outlet channels 242 and 244 of the coolant flow channel 240 pass through the end internal regions A and E, respectively, in such a manner as to face the positive and negative power cables 210 and 220, respectively. Thus, the above-mentioned problems can be solved.

As illustrated in FIG. 4, an electric vehicle charger includes a charger main body 300 and a releasing guide 310 that is mounted inside the charger main body 300. The cable main body 100 having the flat cross-section may be accommodated in the charger main body 300 in a state of resting on the releasing guide 310.

The releasing guide 310 may be configured as a rotary disc. When the releasing guide 310 is rotated clockwise or counterclockwise, the cable main body 100 may be released out of the charger main body 300 or may be accommodated inside the charger main body 300 after being released.

More specifically, an entire width of the charging cable accommodated in the charger main body 300 is determined by the curvature radius thereof and a diameter (height) thereof. Accordingly, the charging cable having the circular cross-section in the related art has a diameter of approximately 30 mm to 35 mm and a minimum curvature radius of approximately 300 mm to 310 mm, as described above. For this reason, when the charging cable is accommodated using a technique as illustrated in FIGS. 6A and 6B, the above-mentioned curvature radius and diameter relatively increase a width of the charger main body 300.

Accordingly, in a case where the charging cable in the related art is accommodated in the charger main body 300, there is a need to increase the size of the charger main body 300. However, a compact charger main body 300 for securing an installation space is required in order to be competitive in a situation where the market for electric vehicles continues to grow gradually. For this reason, the charging cable having the circular cross-section in the related art is difficult to accommodate in the charger main body 300. Consequently, the related art charging cable is arranged outside the charger main body 300 in a fully exposed state.

However, according to the present embodiment, the cable main body 100 that is partitioned into the internal regions A-E, i.e., the cable main body 100 having the flat cross-section in the width direction, is provided (refer to FIGS. 1 and 2). Thus, the entire footprint of the curved or bent charging cable can be decreased by decreasing the curvature radius and the diameter (height) of the cable main body 100 more than in the related art. Consequently, when the releasing guide 310 is selectively rotated counterclockwise in a state where the cable main body 100 rests on the releasing guide 310, the cable main body 100 may be released out of the charger main body 300, and charging may be performed.

For further description, in a state where the cable main body 100 is released out of the charger main body 300, i.e., in a case where, as illustrated in FIG. 6A, switching takes place from a charging state to a standby state for charging, the releasing guide 310 is rotated clockwise. Thus, as illustrated in FIG. 6B, the cable main body 100 may be accommodated inside the charger main body 300.

As a practical example, the releasing guide 310 is described as being configured as a rotary disc, and the cable main body 100 having the decreased curvature radius is described as being connected to the releasing guide 310. However, the present disclosure is not limited to the practical example.

In other words, as illustrated in FIG. 5, the releasing guide 310 may be provided in the shape of a reel drum. Accordingly, the releasing guide 310 may have such a structure that, in a case where the cable main body 100 switches from a state of being wound around the releasing guide 310, i.e., from the standby state for charging to the charging state, the cable main body 100 is rotated counterclockwise. Thus, the cable main body 100 may be released out of the charger main body 300.

According to the present disclosure, a flat-shape structure in which inner electric wires are arranged in a widthwise row is employed, and thus the permissible curvature radius of the charging cable is decreased thereby enabling the charging cable to be accommodated inside the electric vehicle charger as a result of having a smaller footprint. Accordingly, the charging cable is minimally exposed to the outside environment in the standby state for charging. Thus, the effect of possibly improving the image of the electric vehicle charging station can be achieved.

According to the present disclosure, contamination or degradation from external environmental elements can be prevented, and a compact electric vehicle charger can be designed. Thus, the effect of possibly providing ease of installation of the compact electric vehicle charger in a downtown area or the like can be achieved.

In addition, according to the present disclosure, the charging cable is selectively released by a user during charging in a state of being accommodated inside the electric vehicle charger. With this structure, the effect of possibly preventing the charging cable from being damaged due to falling out of the charging coupler and possibly improving the usability of the charging cable can be achieved.

The embodiments of the present disclosure are described herein only in a representative manner with reference to the drawings. It should be understandable to a person of ordinary skill in the art to which the present disclosure pertains that various modifications can be made to the embodiments and that some or all of the constituent elements of the embodiments described herein may be configured to be selectively combined. Therefore, the proper scope of the present disclosure should be defined in the following claims.

What is claimed is:

1. A charging cable for an electric vehicle charger, the charging cable comprising:

a cable main body having a flat cross-section extending in a width direction thereof and partitioned into a plurality of internal regions; and terminal portions through which a positive power cable, a communication/sensor cable, a coolant flow channel, a ground, and a negative power cable respectively pass into the plurality of internal regions sequentially, the terminal portions being arranged in a row across the width direction of the cable main body.

2. The charging cable of claim 1, wherein the positive and negative power cables are arranged to pass through end internal regions, respectively, in each widthwise end portion of the cable main body.

3. The charging cable of claim 1, wherein the coolant flow channel is arranged to pass through a central internal region, in a center portion of the cable main body, and wherein the communication/sensor cable and the ground are arranged to pass through intermediate internal regions, respectively, on each side of the coolant flow channel.

4. The charging cable of claim 1, wherein outlet flow channels of the coolant flow channel extend to the end internal regions at each end portion of the cable main body, through which the positive and negative power cables, respectively, pass, and wherein the outlet flow channels of the coolant flow channel pass through each of the end internal regions, to face the positive and negative power cables, respectively.

5. The charging cable of claim 1, wherein the communication/sensor cable that is mounted in one of the intermediate internal regions includes a plurality of signal cables that are packaged into modules, respectively, and includes a shield layer with which the plurality of signal cables that are packaged into modules, respectively, are wrapped, and wherein the plurality of signal cables include temperature sensor cables.

6. An electric vehicle charger for an electric vehicle, the electric vehicle charger comprising:

a charger main body;

a releasing guide being mounted inside the charger main body;

a cable main body connected to the releasing guide, the cable main body having a flat cross-section across a width direction thereof and partitioned into a plurality of internal regions; and terminal portions through which a positive power cable, a communication/sensor cable, a coolant flow channel, a ground, and a negative power cable pass into the plurality of internal regions, respectively, the terminal portions being arranged sequentially in a row across the width direction of the cable main body.

7. The electric vehicle charger of claim 6, wherein the releasing guide has a structure that, in a state where the cable main body is repeatedly wound around the releasing guide, the cable main body is selectively released out of the charger main body by the releasing guide being rotated.

8. The electric vehicle charger of claim 6, wherein the releasing guide includes a rotary disc on which the cable main body rests and which has a structure wherein the rotary disc is selectively rotated clockwise or counterclockwise according to a standby state for charging or a charging state and thus that the cable main body is released out of the charger main body for the charging state.

9. The electric vehicle charger of claim 6, wherein the terminal portions are formed by:

arranging the positive and negative power cables in end internal regions in each end portion of the cable main body in such a manner as to pass therethrough, respectively;

arranging the coolant flow channel in a central internal region in a center portion of the cable main body in such a manner as to pass therethrough; and arranging the communication/sensor cable and the ground in an intermediate internal region between the coolant flow channel and the positive power cable and in an intermediate internal region between the coolant flow channel and the negative power cable, respectively.

* * * * *